Oct. 23, 1951 A. PALFI 2,572,188
AIRCRAFT PROPELLER
Filed June 16, 1947 3 Sheets-Sheet 1
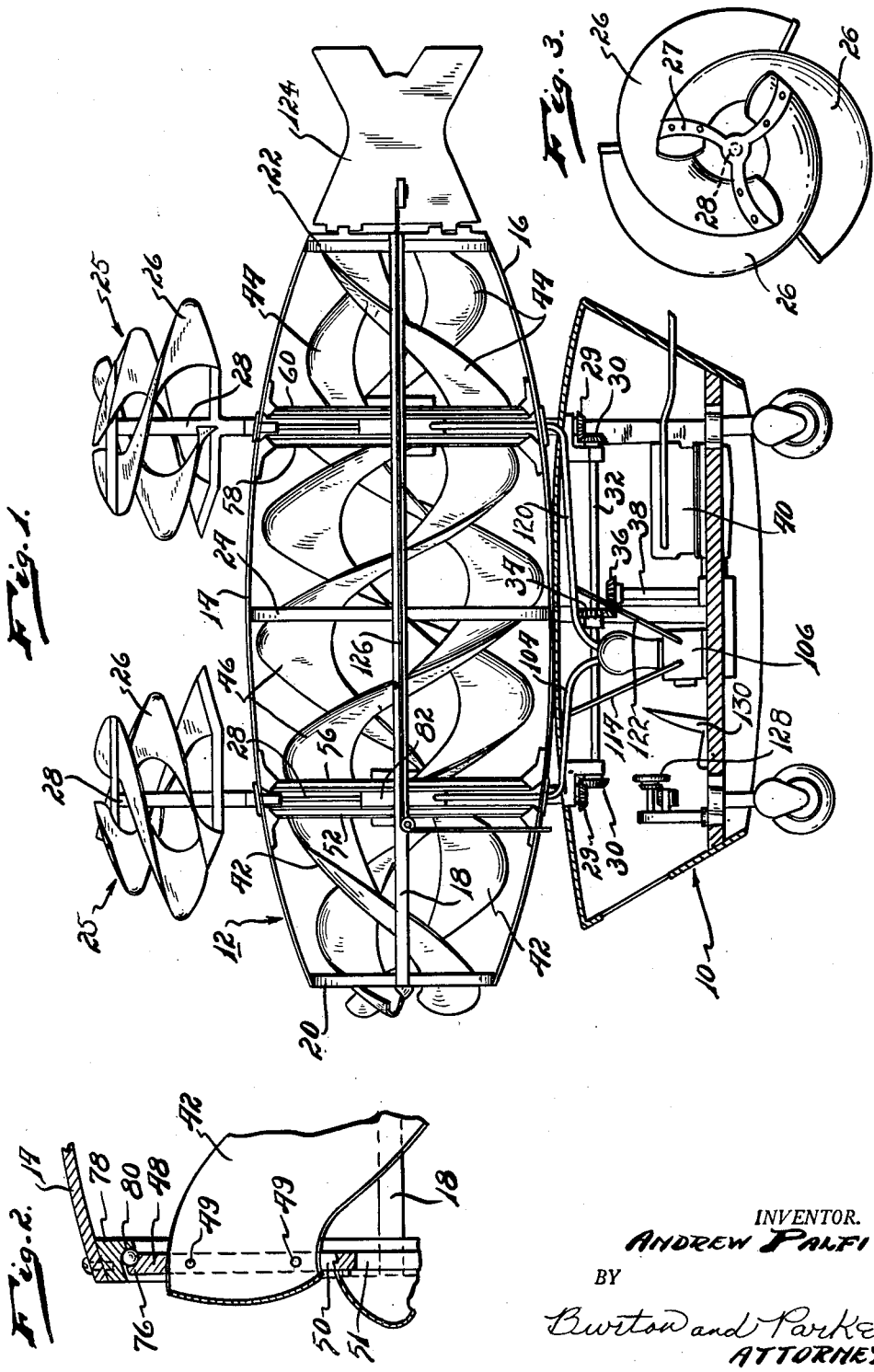
INVENTOR.
ANDREW PALFI
BY
Burton and Parker
ATTORNEY

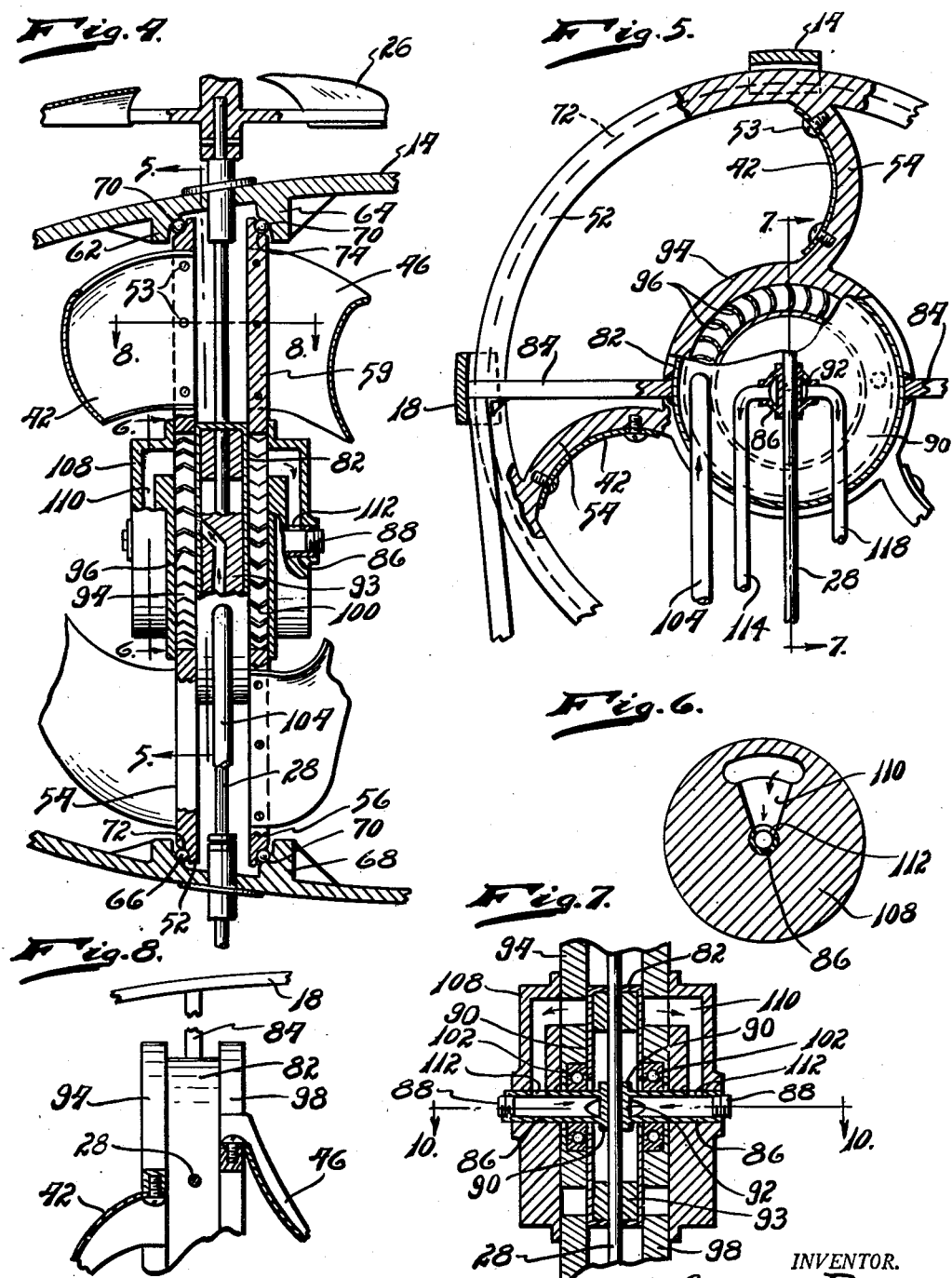

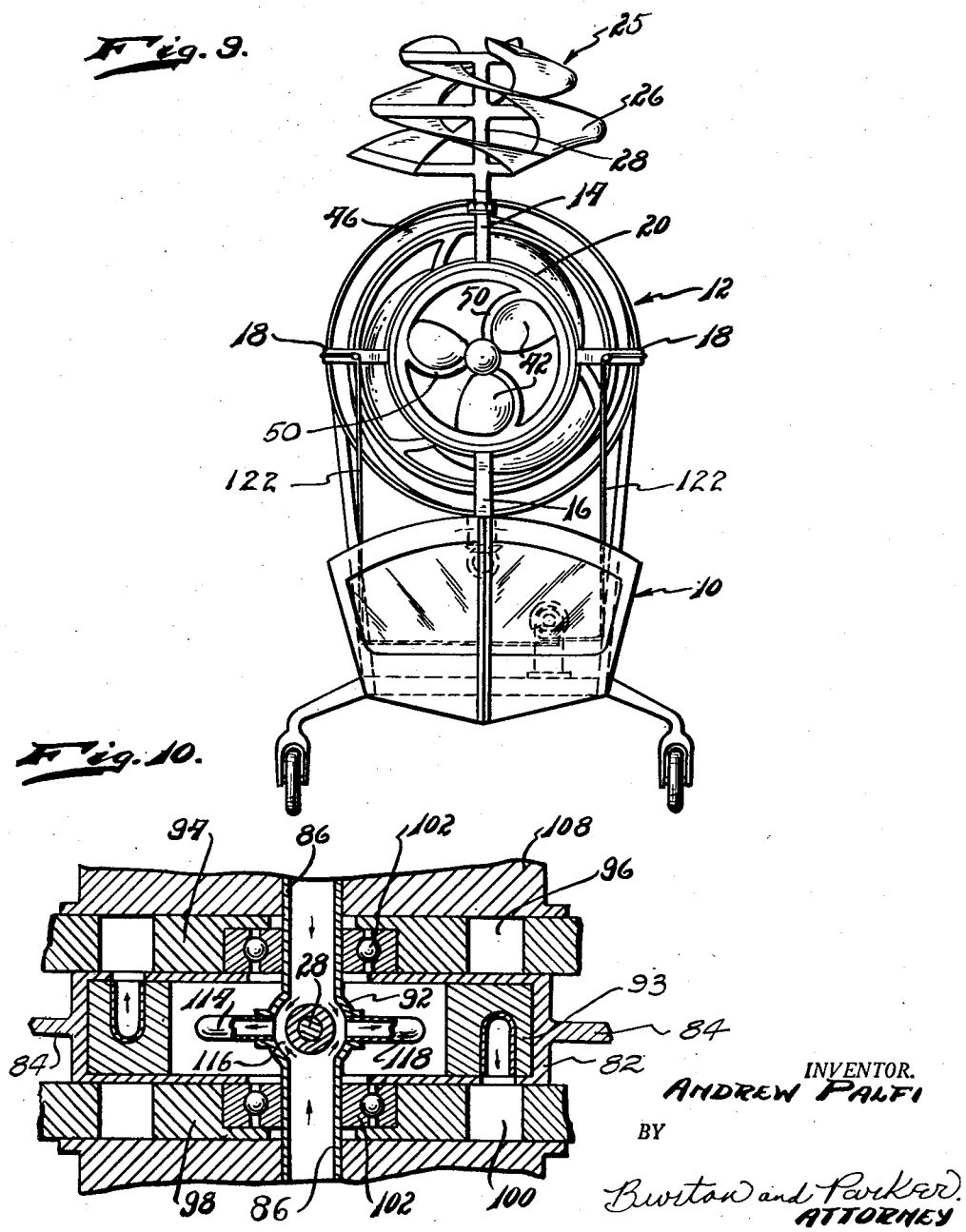

Patented Oct. 23, 1951

2,572,188

UNITED STATES PATENT OFFICE 2,572,188

AIRCRAFT PROPELLER

Andrew Palfi, Detroit, Mich.

Application June 16, 1947, Serial No. 754,808

11 Claims. (Cl. 170—135.22)

This invention relates to aircraft and particularly to a propulsion device for aircraft.

An important object of this invention is to provide an improved aircraft and particularly a propulsion device therefor which is capable of both raising an aircraft vertically and moving the aircraft forwardly relative to the ground. Another important object of the invention is to provide such a device which is constructed of light materials, is easily installed upon aircraft and although composed of light structural parts is capable of being driven at high speeds. A further important object of the invention is to provide such a device having a novel supporting framework containing a plurality of sets of spiral blades each being rotated by a novel turbine drive and reacting with the air to propel the aircraft forwardly. A still further object of the invention is to provide improved means for driving the blades of the propulsion device from the body or fuselage of the aircraft and for controlling the same.

Various other objects, advantages and meritorious features will be more apparent from the following specification, appended claims and accompanying drawings wherein:

Fig. 1 is a side elevation of an aircraft constructed in accordance with this invention having the body or the fuselage thereof shown in vertical cross section, Fig. 2 is an enlarged vertical sectional view through the forward end of the propulsion device showing the manner of mounting the parts thereof, Fig. 3 is a top plan view of one of the lift rotors, Fig. 4 is a vertical sectional view through the forward propulsion mechanism illustrating the manner of driving the same by a turbine, Fig. 5 is a transverse sectional view of the mechanism of Fig. 4 taken along line 5—5 thereof, Fig. 6 is a vertical detail sectional view taken along line 6—6 of Fig. 4, Fig. 7 is a vertical sectional view taken along line 7—7 of Fig. 5, Fig. 8 is a horizontal detail sectional view taken along line 8—8 of Fig. 4, Fig. 9 is a front elevation of the aircraft illustrated in Fig. 1, and Fig. 10 is a horizontal detail sectional view taken along line 10—10 of Fig. 7.

The aircraft comprises in general a body or fuselage 10 having mounted thereabove a propulsion device taking the form of a cigar-shaped structure generally indicated at 12. The structure 12 comprises top and bottom arcuately bowed frame members 14 and 16 respectively and two arcuately bowed side members 18—18 one of which is shown in Fig. 1. At spaced intervals longitudinally of the structure there are provided several ring-shaped supports to which the top and bottom and side members are attached. As shown in Fig. 1 one such ring-shaped support is mounted at the forward end of the structure as indicated at 20 and a similar ring support is mounted at the rear end of the structure as indicated at 22. A middle ring supporting member of larger diameter is indicated at 24. It is understood that the longitudinal members 14—18 are arcuately bowed for securement to these ring supports and when thus assembled form an open cage-like structure in which the forward impelling blades of the aircraft are mounted.

Surmounting the cigar-shaped structure 12 are two longitudinally spaced lift rotors generally indicated at 25—25. Each rotor comprises three spiral blades 26 of similar formation spaced equally circularly around the axis of rotation. These blades are secured by any suitable means such as the metal strips 27 to the vertical shafts 28 upon which these blades are mounted.

The rotors 25—25 are mounted on a longitudinal axis of the structure 12 and their respective shafts 28 extend downwardly therethrough to the fuselage 10 and their lower ends enter the fuselage for receiving driving impulses from any suitable power source located therein. As shown in Fig. 1 the lower ends of the shaft 28 are each provided with bevel gears 29 which mesh with bevel gears 30 on the opposite ends of a horizontal shaft 32. The latter in turn is provided approximately midway between its ends with a bevel gear 34 which meshes with a bevel gear 36 on the upper end of a power shaft 38 which is driven in any suitable manner from a power plant such as the internal combustion engine 40.

The propulsion device 12 contains a plurality of axially spaced apart sets of spiral blades, three being shown in the illustrated embodiment of the invention, which re-act with the air to impel the aircraft forwardly. The sets of spiral blades are driven alternately in opposite directions one to the other by power means operated from the fuselage 10. One set of blades is located in the nose of the structure 12 and comprises the spiral blades 42, there being three such spiral blades in this particular set. A similar set of blades is located at the rear of the structure 12 and comprises three spiral blades 44.

The middle or intermediate set of blades comprises three spiral blades 46. The middle set of blades is longer in length than the two opposite end sets, being in the present embodiment of the invention, approximately twice as long as either of the two endsets.

Each set of blades is supported between rotatable ring members which are journaled for rotation in the framework of the structure 12. The forward ring member or the first set of blades 42 is indicated at 48 in Fig. 2. It is to be noted that the spiral blades 42 of this set project forwardly slightly beyond the plane of the ring and are secured by rivets 49 or other suitable means to radial arms 50 which form integral parts of the ring 48 and extend inwardly for connection to a central hub 51. The rear supporting ring for the forward set of blades is indicated at 52 and as shown in Fig. 4 the spiral blades 42 are secured by rivets 53 to radial arms 54 which form integral parts of the ring.

In a similar manner the remaining sets of blades are secured to their respective supporting rings. The rings for the middle or intermediate set of blades 46 are shown at 56 and 58, the former constituting the forward supporting ring and the latter the rear supporting ring for this assembly of blades. Radial arms 59 forming an integral part of the ring 56 form supports for the forward ends of the blades 46 as shown in Fig. 5. A similar mounting is provided for the rear ends of the blades 46 on the ring 58. The rear set of blades 44 are secured at their forward end to the supporting ring 60 and at their rear ends to a supporting ring which is mounted within the plane of the support 22 heretofore described. All the spiral blades of the different sets in the structure 12 are equally circularly spaced around the axis of the structure similarly to the lift rotors 25—25 previously described. It is to be noted that all the impeller blades 42, 44 and 46 are not only spiral in formation but also, as shown in Figs. 2, 4 and 5, are curved or bowed in their radial direction and that the supporting radial arms to which these blades are secured are curved or bowed corresponding to the transverse curvature of the blades. The spiral blades are all formed of material which is relatively light in weight, thin and slightly flexible.

The various supporting ring members of the sets of spiral blades 42, 44 and 46 are mounted for rotation in the framework formed by the longitudinal frame members 14, 16 and 18—18. On the inner or undersides of these frame members opposite each rotating ring, there is provided a bearing support in which are mounted anti-friction rollers or balls which bear upon the rings and hold and maintain the same in their respective planes of rotation. For the larger intermediate rings 52, 56, 58 and 60, each top and bottom and side frame member of the structure 12 is provided with an inwardly projecting bracket containing an anti-friction bearing which in the illustrated embodiment of the invention is a ball bearing. Referring to Fig. 4, which typifies the bearing mounting for all the larger blade supporting rings, there is provided on the underside of the top frame member 14 a projection or bracket 62 for the ring 52 and a similar bracket 64 for the ring 56. In like manner, the bottom frame member 16 is provided with two brackets 66 and 68 for the two rings 52 and 56 respectively. Each bracket retains a ball bearing 70 which is free to rotate within the bracket but is locked therein against withdrawal. Ring 52 and similarly ring 56 are each provided with a circular groove or race 72 and 74 respectively in which the balls 70 ride. The ball race 72 of the ring 52 is forwardly inclined with respect to the axis of rotation of the forwardly propelling blades whereas the ball race 74 of ring 56 is rearwardly inclined thereto. The faces of the ball returning brackets 62—68 from which the balls 70 project are inclined as shown in Fig. 1 in order to dispose the balls within the races of the rings 52 and 56 and at the same time hold the ring 52 from forward movement and the ring 56 from rearward movement in the frame 12.

The blade supporting rings 58 and 60 are similarly journaled for rotation about the longitudinal axis of the frame 12 as shown in Fig. 1. However, the ring 58 is held by its journal support from forward movement with respect to the frame whereas ring 60 is held from rearward movement. The journal supports for the rings at the extreme ends of the frame are similar and Fig. 2 illustrates one such mounting. The forward blade supporting ring 48 is provided with an inwardly inclined peripheral groove or track 76. The forward ends of the frame members 14, 16 and 18 are each provided on their undersides with a ball retaining bracket such as that shown at 78 in Fig. 2 for the upper frame member 14. Balls 80 retained in the brackets project into the raceway 76 and permit the ring 48 to rotate freely while at the same time preventing bodily movement of the ring inwardly of the frame 12. In like manner, the rear supporting ring for the blades 44 is similarly mounted for rotation except that the ball race and the ball retaining brackets are so mounted with respect to one another as to prevent bodily movement of the ring forwardly or toward the center of the frame 12.

The supporting rings of each set of blades are connected together by their respective blades. For example, the front set of spiral blades 42 connect the two rings 48 and 52 together for joint rotation and the spiral blades 46 of the middle set connect the two rings 56 and 58 together for joint rotation. Thus connected, the rings of each set are held against their respective anti-friction bearing supports carried by the frame 12 and prevent from bodily movement away from one another. In operation, the centrifugal force developed by the rotation of the spiral blades causes the blades, since they are slightly flexible, to draw the rings of their particular set of blades toward one another and more tightly against the anti-friction bearing supports.

Supported in the plane of each of the two vertical driving shafts 28—28 of the lift rotors on the longitudinal axis of the frame 12 is a circular housing 82 forming part of a novel turbine drive for rotating the forward impeller blades. Extending transversely and horizontally of the frame 12, as shown in Fig. 5, are supporting bars 84 which extend between the housing 82 and the side frame members 18—18 and assist in supporting the housing in place. The vertical drive shaft 28 with which each housing is associated extends upwardly therethrough as shown in Figs. 5 and 7. On opposite sides of the shaft 28 on the longitudinal axis of the frame 12 there are provided two short hollow stub shafts 86—86 which correspond in size and length to one another and have their outer ends closed or sealed such as by the plugs 88. The stub shafts project through the side walls 90—90 of the housing 82 inwardly thereof and terminate in a body 92 which is vertically bored to receive the shaft 28 and form a bearing therefor. An annular member 93 is provided within the housing 82 which is bored on diametrically opposite sides thereof to receive the shaft 28 extending therethrough.

Each housing 82 is disposed between the planes of two rotating blade supporting rings of the frame work 12 of the forward propulsion device. As shown in Fig. 4, the housing 82 is located between the planes of the two rings 52 and 56. The radial arms of the ring 52 supports a centrally mounted disc-shaped plate 94 having a circular series of equally spaced apart turbine impeller vanes 96 formed therein. Similarly, the radial arms 59 of the ring 56 support a disc-shaped plate 98 having impeller vanes 100. These plates 94 and 98 are axially bored to provide an annular clearance around the stub shafts 88—88 and between the same roller bearings 102 are mounted for journaling the turbine plates for rotation thereon. The impeller vanes as shown in Fig. 4 are cut completely through from one side of their respective plates to the other side. The impeller vanes 96 are arranged for rotating their respective ring 52 in one direction whereas the impeller vanes 100 of the other adjacent ring 56 are arranged to rotate the ring in the opposite direction. The fluid impelled elements of the two turbine drives for the forward set of rings 52 and 56 are similarly duplicated for the rear set of rings 58 and 60.

Fluid under pressure, such as air, is employed to drive the turbine elements of the blade supporting rings. For each turbine element there is provided a fluid delivery conduit and a fluid take-off conduit. For example, for the impeller vanes 96 of the ring 52, a conduit 104 extends from a source of air pressure in the fuselage 10, such as the pump represented at 106 in the fuselage, and leads upwardly into one side of the casing or housing 82 where it is bent as shown in Fig. 4 to discharge air under pressure against the vanes 96. Preferably the terminating end of the conduit 104 is below the top of the plate 94. Air thus directed against the vanes is conveyed back to the inlet side of the pump. This is accomplished by mounting a circular block 108 which is fixed concentrically upon the stub shaft 86 around which it extends and is located on the side of the impeller plate 94 opposite to the housing 82. This block is provided with a flaring passage therein indicated at 110 in Figs. 4 and 6 which opens out against the upper or top portion of the plate in alignment with the vanes 96. Air discharged against the vanes is picked up at the widened inlet of the passage 110 and conveyed thereby downwardly to the hollow stub shaft 86. A port 112 is provided in the stub shaft 86 opening into the passage 110 and air directed downwardly through the passage enters the hollow interior of the stub shaft. An air return conduit is shown at 114 which enters the housing 82 and is bent to extend into the body 92. The latter is shaped as shown in Fig. 10 to provide communicating passages 116—116 which extend around opposite sides of the shaft 28 and open into the hollow stub shafts 86—86. The air return conduit 114 opens into one of the communicating passages 116 as shown in Fig. 10. Thus, air discharged by the conduit 104 against the vanes 96 is picked up at a point circularly spaced therefrom and converged by the passage 110, stub shaft 86, passage 116, and returned to the pump by way of conduit 114. A similar air return conduit 118 is provided for returning air delivered against the vanes 100 of the turbine plate 98.

A similar air conduit system is provided for driving the turbine blades 100 of the ring 56 and also for driving each of the rings 58 and 60. In Fig. 1 an air conduit 120 is shown leading upwardly and rearwardly from the fuselage for delivering air under pressure for driving the ring 58. A return conduit 122 similar to conduit 114 is shown leading back to the pump. The air delivery and return conduits for operating the two remaining rings 56 and 60 are mounted on the opposite side of the longitudinal median line of the aircraft and run co-extensive with the conduits 104, 114, 120 and 122 so that they are not visible in Fig. 1.

As previously mentioned, the spiral blades 42 in the nose of the frame 12 rotate in opposite direction to the middle set of blades 46. The rear set of spiral blades 44 rotate opposite to the middle set and in the same direction as the blades 42. The convolutions of the blades 42 and 44 of the leading and rear sets of blades turn or spiral in one direction whereas the convolutions of the middle set of blades 46 spiral in the opposite direction. Rotating rapidly, these spiral blades draw air through the frame 12 and impel the aircraft forwardly through the air. The lift rotors 25—25 may be operating all the time to maintain the craft at the desired height. Varying their speed of rotation will cause the aircraft to rise or fall. The rotors 25—25 may be increased in radial dimension to improve their lifting characteristics and if desired may be single or coaxial types of rotors utilizing elongated blades in place of the spiral blades 26.

Turning movement of the aircraft may be controlled by a rudder 124 at the rear of the frame 12 from which cables 126 run forwardly along the outside of the side frame members 18—18 to a point above the pilot compartment and then extend downwardly into the fuselage where they may be pulled or slackened by a customary rudder control device 128 located forwardly of the pilot's seat 130.

What I claim is:

1. Aircraft propulsion means comprising an elongated open frame work of supporting members wider in the middle and contracting toward the opposite ends, a plurality of air screws of a spiral formation mounted in said frame one behind the other and rotatable about the longitudinal axis of the frame work, the lateral extent of said air screws conforming to the width of the frame work in their respective location being wider in the middle of the frame work and progressively contracting toward the outer ends thereof, an air turbine drive device associated with each of said air screws, and means for supplying fluid under pressure to said turbine drive devices.

2. Aircraft propulsion means comprising an elongated open framework of connected supporting members being circular throughout its length and wider in the middle than at either of the opposite ends thereof, three air screws mounted in said framework one behind the other and rotatable about a common axis normally horizontal when the aircraft is in flight, each of said air screws including two or more spiral blades sinuously curved in the same direction and arranged with respect to the spiral blades of the adjacent set to curve in the opposite direction thereto, a fluid driven turbine associated with each of said air screws having the impeller vanes thereof arranged opposite to the vanes of the turbine of the adjacent air screw, and means for supplying fluid from a source of fluid pressure to each of said turbines and driving the same and the air screws alternately in opposite direction to one another.

3. Aircraft propulsion means comprising, in combination, a plurality of connected longitudinally and transversely extending supporting members forming an elongated open framework of circular formation in the lateral dimension of the framework and being widest in the middle and tapering forwardly and rearwardly therefrom, three air screws mounted in the framework one behind the other and all rotatable about the central longitudinal axis of the framework, each of said air screws comprising two or more spiral blades sinuously curved in the same direction and fixed between longitudinally spaced apart pair of rings, means journaling the rings of each air screw for rotation in the framework, a fluid drive turbine associated with each of said air screws, and a source of fluid pressure having means for supplying fluid under pressure to said turbines to drive the same.

4. Propelling means for the aircraft including, in combination, a cage-like structure of spaced connected supporting members, said structure being elongated in one dimension and being circular in its lateral dimension from substantially one end to the other end, a pair of ring members rotatably journalled in said cage-like structure about an axis parallel to the longitudinal axis of the structure and axially spaced apart from one another, a plurality of correspondingly shaped spiral blades extending between said ring members and secured thereto for joint rotation, and means for rotating at least one of said ring members from a source of power.

5. Aircraft propelling means comprising, in combination, a plurality of longitudinally and transversely extending supporting members connected together and forming a normally horizontal elongated frame having a circular lateral dimension substantially from one end to the other end thereof, a plurality of ring members of a size corresponding to the lateral dimension of the frame, means on the frame forming raceways for rotatably mounting said ring members for rotation about the longitudinal axis of the frame, each ring member provided with a plurality of inwardly extending radial arms equally spaced apart circumferentially and being correspondingly curved in the plane of the ring member, a set of spiral blades extending sinuously between each successive pair of ring members each having a transverse curvature corresponding to the curvature of said radial arms, said blades having their opposite ends cradled in and secured to the curved portions of the arms of the pair of ring members between which they extend, the ring members joined by each set of spiral blades forming a separate rotatable unit in the open frame, the adjacent ends of said units being slightly spaced apart to form a clearance therebetween extending completely across the frame, one or more driving shafts extending upwardly through the clearances between said units and projecting above the frame, lift rotors carried on the projection ends of said driving shafts, turbine impeller blades carried on the inner ends of the radial arms of at least one ring member of each of said units, and power means for operating said driving shafts and for simultaneously supplying fluid under pressure for reaction with said turbine blades to rotate said units.

6. Aircraft propelling means comprising, in combination, a plurality of longitudinally and transversely extending supporting members connected together and forming an open elongated frame having a circular lateral dimension from one end to the other end thereof and being wider in the middle and tapering gradually to the opposite ends thereof, a plurality of forward propelling devices mounted co-axially in the frame one behind the other, each device comprising a pair of relatively widely spaced apart ring members connected together by a plurality of correspondingly shaped helical blades extending therebetween, means on the frame forming raceways for rotatably mounting said ring members and the blades connected thereto for rotation, the adjacent ends of said devices being slightly spaced apart to form a clearance therebetween extending transversely across the frame, one or more driving shafts extending through said clearances to the upper side of the frame where they project therefrom, lift rotors carried on the upper projecting ends of said one or more driving shafts, a set of turbine impeller blades carried by one ring member of each propelling device, means for delivering fluid under pressure to each set of turbine impeller blades and arranged to rotate the blades of the devices alternately in opposite directions to one another, and a source of power operatively connected to said shafts for rotating the same and operatively connected to a source of fluid pressure for said turbine delivery means.

7. Aircraft propelling means comprising, in combination, an elongated interiorly hollowed supporting frame opened at its opposite ends, a plurality of propelling units mounted in the frame one behind the other, each unit including a pair of longitudinally spaced apart ring members connected together by a plurality of correspondingly shaped spiral blades extending therebetween, means on the frame forming raceways for mounting said ring members and the blades connected thereto for joint rotation, the ring members at the adjacent ends of said units being slightly spaced apart and each carrying a set of turbine impeller blades, and a turbine impeller common to each adjacent pair of units located in the plane between the adjacent ring members of said units and provided with means for directing fluid against the impeller blades carried by the ring members for jointly rotating the units.

8. Aircraft propelling means comprising, in combination, an elongated interiorly hollowed supporting frame opened at its opposite ends, said frame being circular in its lateral dimension from one end to the other end and progressively increasing in diameter from its opposite ends to the mid-section thereof, a plurality of propelling units mounted in the frame one behind the other, each unit including a pair of co-axially related ring members longitudinally spaced apart in the frame and conforming generally in size to the interior dimension of the frame opposite which they are placed, a plurality of spiral blades for each unit extending between the pair of ring members thereof and secured thereto for joint rotation, the lateral extent of the spiral blades of each unit varying from one end to the other end thereof and conforming generally to interior lateral dimensions of the frame opposite which they are placed, and means on the inside portion of the frame forming raceways for mounting said ring members of each unit and the spiral blades connected thereto for rotation.

9. Aircraft propulsive means including, in combination, a plurality of longitudinally extending members and a plurality of transversely extending members connected together and forming an elongated open framework of circular formation in the lateral dimension of the framework and being wider in the middle and tapering forwardly and rearwardly between its opposite ends, three air screws mounted in the framework with one of the air screws in the forward part thereof, another air screw in the rear part thereof, and the third remaining air screw in the middle part thereof, each of said air screws comprising a plurality of helical blades spaced circularly apart from one another and mounted within and fixed to a pair of axially spaced apart ring members, means journaling the ring members for rotation in the framework with the air screws mounted in line one behind the other and rotatable about the longitudinal axis of the framework, a fluid drive turbine operatively associated with each of said air screws, the impeller vanes of the turbine associated with the middle air screw extending at an inclination opposite to the impeller blades of the turbine associated with the front and the rear air screws, a source of fluid pressure, and means for delivering fluid under pressure from said source to each of said turbines and arranged to drive the turbine for the middle air screw in a direction of rotation opposite to that of the front and the rear air screws.

10. Aircraft propulsion means including, in combination, a cage-like structure of longitudinally and transversely extending supporting members connected together, said structure being elongated in one direction and circular in its transverse dimension from substantially one end to the front end thereof, a pair of ring members having their rim portions supported in said structure for rotation about an axis parallel to the longitudinal axis of the structure, said ring members being axially spaced apart and each provided with a plurality of similarly shaped arms fixed to their respective ring members and projecting generally radially inwardly therefrom, said arms being substantially equally circumferentially spaced apart and being similarly curved in the plane of their respective ring members, and a plurality of spiral blades extending sinuously between said pair of ring members and corresponding in number to the number of radial arms carried by the ring members, said spiral blades each having a transverse curvature corresponding to the curvature of said arms and further having the opposite ends of the blades cradled in and secured to the arms, the ring members, the radial arms, and the spiral blades joining together to form a rotatable unit in the cage-like structure.

11. Aircraft propelling means comprising, in combination, a plurality of longitudinally and transversely extending supporting members connected together into an open frame elongated in one dimension, two or more pairs of ring members mounted in said frame for rotation about the longitudinal axis thereof, said ring members of each pair being relatively widely spread apart axially of the frame and carrying a plurality of similarly shaped spiral blades extending between each pair of ring members and secured thereto to form a rotatable unit in the frame, the adjacent ends of such rotatable units being slightly spaced apart axially from one another, one or more driving shafts extending upwardly through the frame between the pairs of such units and projecting above the frame, and a vertical lift rotor carried on the upper projecting end of each of said driving shafts.

ANDREW PALFI.

REFERENCES CITED

The following references are of record in the file of this patent:

UNITED STATES PATENTS

| Number | Name | Date |
| --- | --- | --- |
| 1,160,473 | Warner | Nov. 16, 1915 |
| 2,050,349 | Lysholm et al. | Aug. 11, 1936 |
| 2,133,853 | Feige | Oct. 18, 1938 |
| 2,183,151 | Peterson | Dec. 12, 1939 |
| 2,230,398 | Benjafield | Feb. 4, 1941 |
| 2,281,203 | Pitcairn | Apr. 28, 1942 |
| 2,312,995 | Anxionnaz | Mar. 2, 1943 |
| 2,409,446 | Pavlecka et al. | Oct. 15, 1946 |
| 2,425,904 | Vernon | Aug. 19, 1947 |

FOREIGN PATENTS

| Number | Country | Date |
| --- | --- | --- |
| 346,936 | France | Dec. 16, 1904 |